US012021483B2

(12) United States Patent
Almy

(10) Patent No.: US 12,021,483 B2
(45) Date of Patent: Jun. 25, 2024

(54) TRUSS FOUNDATIONS FOR FROST-HEAVE ENVIRONMENTS

(71) Applicant: Ojjo, Inc., San Rafael, CA (US)

(72) Inventor: Charles Almy, Berkeley, CA (US)

(73) Assignee: Ojjo, Inc., San Rafael, CA (US)

( * ) Notice: Subject to any disclaimer, the term of this patent is extended or adjusted under 35 U.S.C. 154(b) by 336 days.

(21) Appl. No.: 17/187,488

(22) Filed: Feb. 26, 2021

(65) Prior Publication Data

US 2021/0273603 A1    Sep. 2, 2021

Related U.S. Application Data

(60) Provisional application No. 62/982,080, filed on Feb. 27, 2020.

(51) Int. Cl.
| | |
|---|---|
| *H02S 20/32* | (2014.01) |
| *F24S 25/10* | (2018.01) |
| *F24S 25/617* | (2018.01) |
| *H02S 20/10* | (2014.01) |
| *F24S 25/00* | (2018.01) |

(52) U.S. Cl.
CPC .............. *H02S 20/32* (2014.12); *F24S 25/10* (2018.05); *F24S 25/617* (2018.05); *H02S 20/10* (2014.12); *F24S 2025/802* (2018.05); *Y02E 10/47* (2013.01)

(58) Field of Classification Search
None
See application file for complete search history.

(56) References Cited

U.S. PATENT DOCUMENTS

| | | | |
|---|---|---|---|
| 3,630,037 A | 12/1971 | Howard | |
| 4,478,234 A * | 10/1984 | Bester | E04H 15/48 |
| | | | 135/93 |
| 2011/0186040 A1 | 8/2011 | Liao | |
| 2013/0048582 A1* | 2/2013 | Kruse | F24S 30/425 |
| | | | 29/897.31 |
| 2016/0060838 A1 | 3/2016 | El Naggar et al. | |
| 2016/0329860 A1* | 11/2016 | Kalus | H02S 20/10 |
| 2018/0051915 A1* | 2/2018 | Rainer | F24S 25/10 |
| 2018/0087231 A1* | 3/2018 | Masula | E02D 7/22 |
| 2020/0072505 A1* | 3/2020 | Hudson | F24S 50/20 |
| 2020/0076354 A1* | 3/2020 | West | F24S 25/65 |
| 2020/0076355 A1* | 3/2020 | Hudson | F24S 25/70 |

FOREIGN PATENT DOCUMENTS

JP    6430721 B2    11/2018

OTHER PUBLICATIONS

International Search Report for PCT/US2021/020088.

* cited by examiner

*Primary Examiner* — Steven M Marsh
(74) *Attorney, Agent, or Firm* — Phillip D. Mancini

(57) ABSTRACT

A truss foundation for single-axis trackers that are installed in climates that experience significant frost heave. Truss legs are oriented to be substantially plumb, to eliminate adfreeze moment on below-ground components in the frost zone. Different truss caps may be used depending on the type of single-axis tracker and/or tracker component is supported. In some cases, truss legs may curve just before entering the ground. In others, below-ground and above-ground components may extend along the same axis and remain plumb with the truss cap providing additional elevation to for the tracker to clear the wider truss legs.

17 Claims, 10 Drawing Sheets

PRIOR ART

TRUSS FOUNDATIONS FOR FROST-HEAVE ENVIRONMENTS

CROSS-REFERENCE TO RELATED APPICATIONS

This claims priority to U.S. provisional patent application No. 62/982,080 filed on Feb. 27, 2020, titled "Single-axis tracker foundations", the disclosure of which is hereby incorporated by reference in its entirety.

BACKGROUND

Single-axis trackers have become the most popular form factor for so-called utility scale solar arrays. These systems consist of rows of solar panels attached to North-South oriented torque tubes that move slowly from an East-facing to West-facing orientation through the course of each day to keep the panels perpendicular to radiation from the sun. These structures are typically supported by rows of ground penetrating foundations. Historically, wide-flange steel beams known as H-piles were used to support single-axis trackers. However, more recently, the Applicant of this disclosure has introduced an A-frame-shaped truss foundation for single-axis trackers to the utility-scale marketplace as a cost-saving alternative to H-piles. Known commercially as EARTH TRUSS, this system relies on a pair of adjacent angled legs that form a truss with the ground.

When supporting single-axis trackers, truss foundations off several advantages over H-piles because they convert lateral loads into axial forces of tension and compression, rather than into bending moments. This enables the tracker to be supported with less steel and also enables the below-ground components to be driven to shallower embedment depths than required for H-piles. Shallower embedment depths result in fewer refusals, thereby avoiding an expensive and time-consuming refusal mitigation process. Also, with the hollow, open-ended geometry of EARTH TRUSS components, it is possible to actuate a drilling tool through the screw anchor while it is driven into the ground, thereby speeding workflow relative to pre-drilling.

Despite their advantages, there are some climates where H-piles may outperform truss foundations. As the price of solar panels has dropped well below one dollar per watt, utility-scale solar arrays are being built in latitudes not previously cost effective for solar. Northern latitudes typically experience sustained sub-zero temperatures during the winter, which can be disruptive to foundations. The phenomena know as frost heave occurs where moisture in the portion of the soil from grade down to the frost line freezes, causing the ground to heave upwards. This can be disruptive to any foundation that does not extend down below the frost line. This is especially true when the foundation components are oriented at an angle with respect to plumb. Sub-surface ice in contact with such components will tend to pull them upwards, applying a moment to the foundation. Where the depth of frost zone is substantial (i.e., multiple feet), such a moment may destroy or at least compromise the foundation. In order to prevent this, various embodiments of the invention provide truss foundations that are optimized for use in climates that are subject to substantial frost heave during winter.

DETAILED DESCRIPTION

The following description is intended to convey a thorough understanding of the embodiments described by providing a number of specific embodiments and details involving A-frame foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

As mentioned in the background, single-axis trackers have traditionally been supported by monopiles, that is, rows of individual H-pile foundations. To compete with conventional H-piles, the Applicant of this disclosure introduced an A-frame-shaped truss foundation to the utility-scale solar marketplace known commercially as EARTH TRUSS. EARTH TRUSS consists of a pair of angled truss legs, extending below and above ground that are joined at their above ground ends with an adapter, truss cap or bearing adapter. This adapter, truss cap, or bearing adapter completes the A-frame-shaped structure and may provide a mounting surface to support a tracker component such as a bearing assembly or drive motor.

Figure 1A:
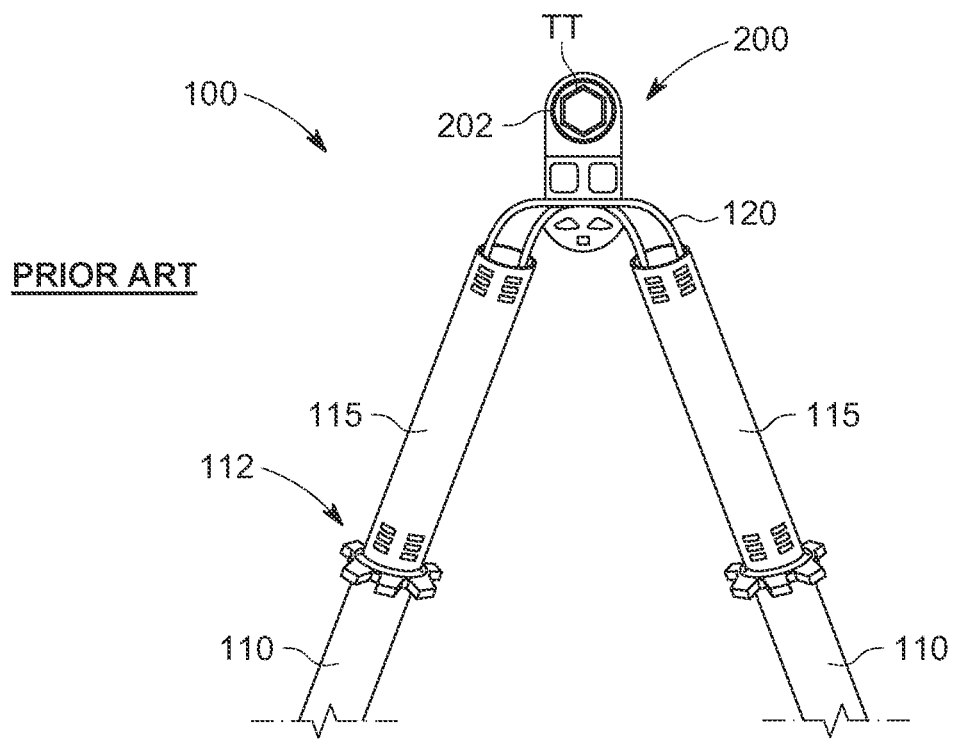
FIG. 1A shows truss foundation supporting a portion of a single-axis tracker in accordance with various embodiments of the invention.
Figure 1B:
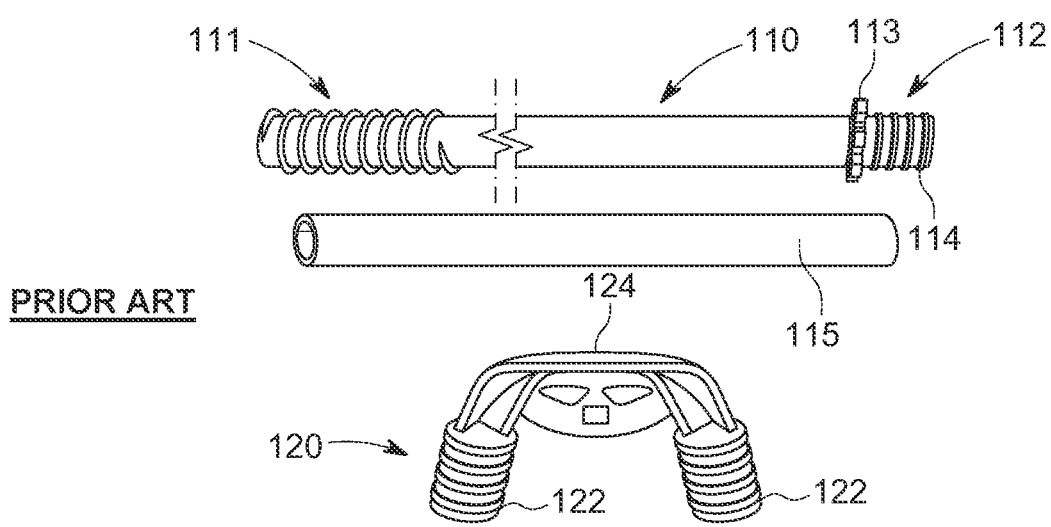
FIG. 1B shows components used to make the truss foundation of FIG. 1.

Turning to the Figures, FIG. 1A shows EARTH TRUSS foundation 100 in accordance with various embodiments of the invention while FIG. 1B shows the individual components used to construct it. Truss foundation 100 is made of a pair of adjacent angled truss legs extending into underlying ground that are joined at the apex by truss cap or adapter 120. In this example, truss cap 120 is supporting single-axis tracker bearing assembly 200. Bearing assembly 200 is analogous to bearing assemblies used in the DuraTrack HZ NX Series of single-axis trackers manufactured and sold by Array Technology, Inc. of Albuquerque, NM. In such a tracker, the torque tube, labeled "TT" in the figures, is seated within bearing 202 and rotates about its own axis.

Each truss leg of truss foundation 100 consists of screw anchor 110 and upper leg portion 115. Screw anchor 110 is a section of elongated, hollow, galvanized steel tube (e.g., 1-2 meters) with external thread form 111 as its lower end and driving coupler 112 at the upper end. Driving coupler 112 is welded or otherwise attached to the upper end and includes driving features 113 that are engage by the chuck of a rotary driver, and, connecting portion 114 that extends away from the driving features. Connecting portion 114 is received in the open lower end of upper leg portion 115. Connecting portion 114 has a series of channels formed in it that provide recesses to deform upper leg 115 into when a crimping tool is applied to the portion of the upper leg that overlaps with it. Driving features 113 circumscribing coupler 112 act as a stop to limit the extent to which connecting portion 114 of coupler 112 extends into the upper leg.

In various embodiments, truss 100 is assembled with the assistance of a machine that is capable of driving the pair of adjacent screw anchors 110 at angles to one another on either side of an intended North-South tracker row. Then, truss cap 120 is held at the proper orientation, in some embodiments by a jig, holder or other device on the machine, to match the position and orientation of other truss caps in the same row. With the truss cap in place, upper leg portions 115 are sleeved over connecting portions 122 of truss cap 120 and over connecting portion 114 of coupler 112 at the head of screw anchor 110. Then, in various embodiments, a hydraulic crimping device is placed over the overlapping portions of upper leg 115 to deform it into the recesses formed in connecting portions 122 and 114. For a more thorough discussion of the machine see commonly assigned and co-pending U.S. patent application Ser. No. 17/095,616. For a discussion of assembling trusses with a hydraulic crimper, see commonly assigned and U.S. patent application Ser. No. 17/152,622. The disclosures application Ser. Nos. 17/095,616 and 17/152,622 are hereby incorporated by reference in their entirety.

Figure 2B:
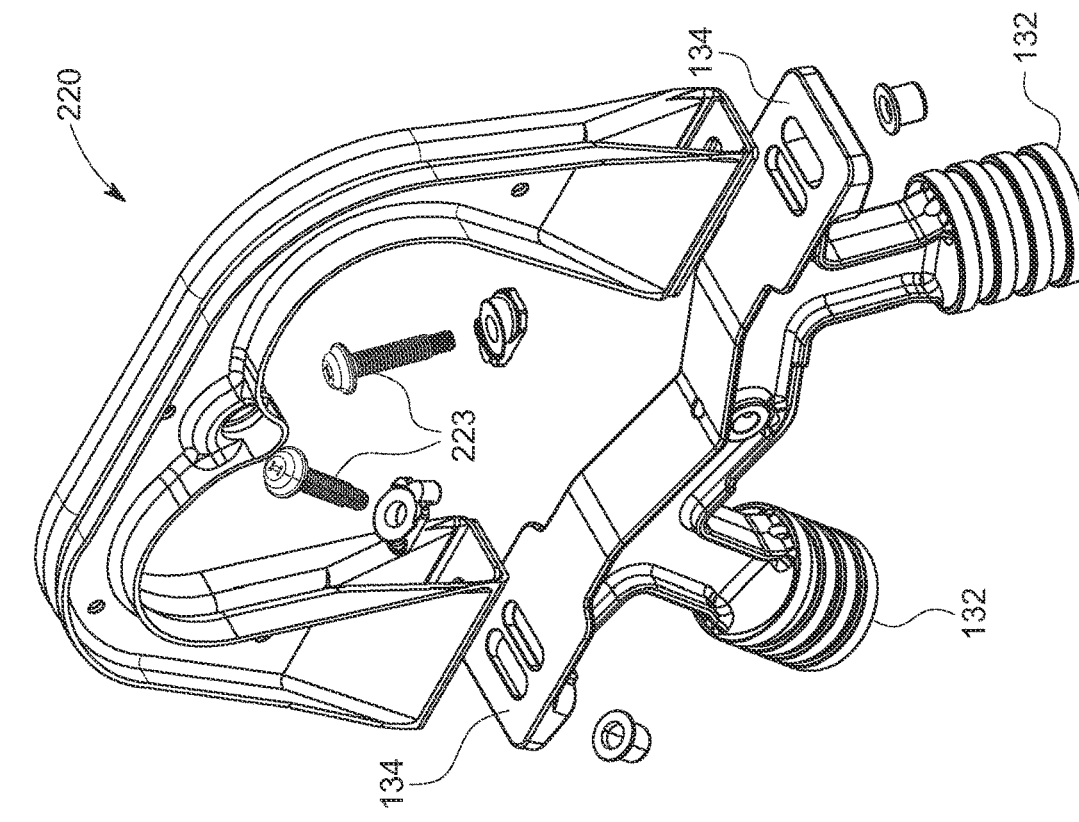
FIGS. 2A and 2B show front and perspective views of a truss cap and bearing housing assembly in accordance with various embodiments of the invention.
Figure 2A:
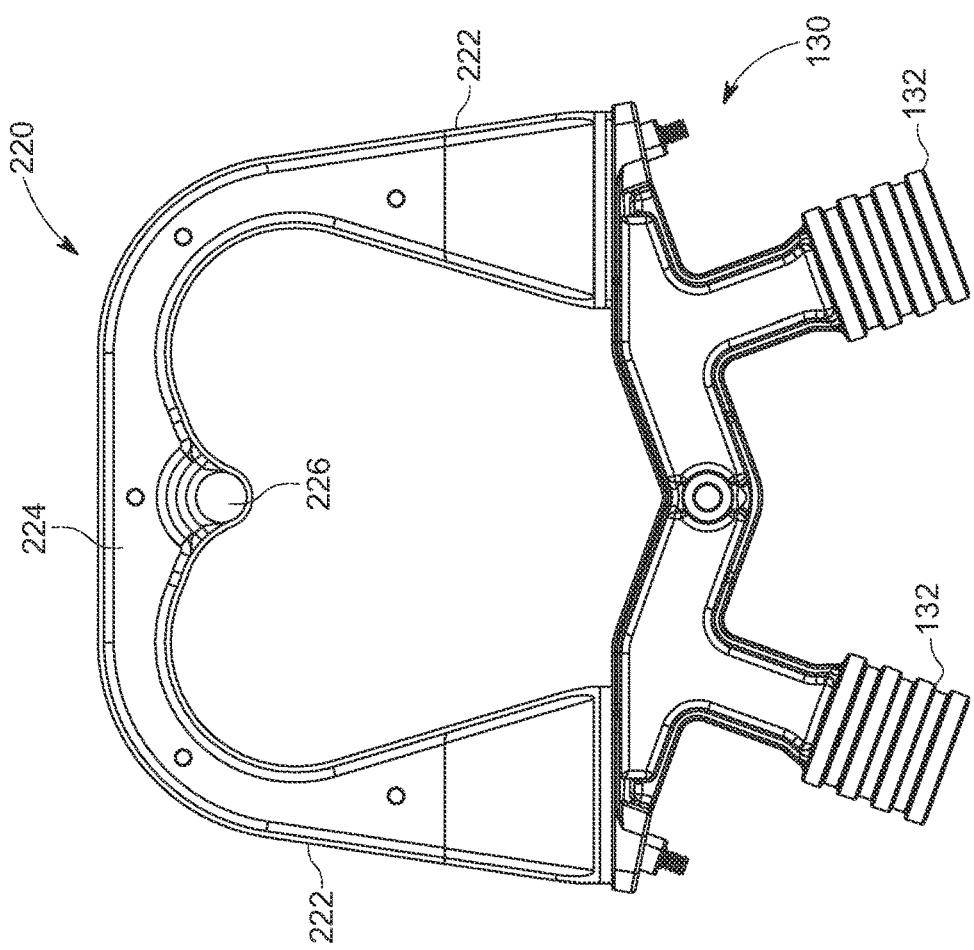

Turning to FIGS. 2A and 2B, these figures show another truss cap 130 that is particular designed to support bearing housing assembly 220. Like truss cap 120 in FIGS. 1 and 2, truss cap 130 joins the free ends of the pair of adjacent truss legs with a pair of connecting portions 132 that are received in each upper leg portion 115. However, unlike truss cap 120, truss cap 130 has a pair of support portions 134 designed to support tracker bearing housing assembly (BHA) 220. BHA 220 is a component of the NX Horizon single-axis tracker from NEXTracker, Inc. of Fremont, CA. NEXTracker's single-axis tracker is a top down or so-called mechanically balanced tracker where the torque tube hangs from a pin through their bearing housing assembly and swings through an arc that is bounded by the bearing housing assembly. A torque tube bracket is attached to the pin and to the torque tube. The drive motor in this tracker is offset so that its axis of rotation is aligned with the bearing pin rather than with the torque tube. The tube curves up on either side of the motor to pass through the clewing drive's gear assembly. According to NEXTracker, this configuration is mechanically balanced so that there are no overturning moments regardless of the angle of the panels. Rather than rotating about its own axis, the torque tube in the NEXTracker single-axis tracker hangs from a pin seated in bearing 226 proximate to custom 224 of NEXTracker's cardioid-shaped BHA 220. Legs 222 and cusp 224 define a space that bounds the arc that torque tube TT is able to swing through as the tube is moved each day. The drive motor in such a tracker is offset so that the rotational axis of the tracker is the bearing pin rather than the torque tube. The various embodiments of the invention are applicable to either the ATI or NEXTracker style of single-axis trackers as well as various other trackers available in the marketplace.

Figure 3:
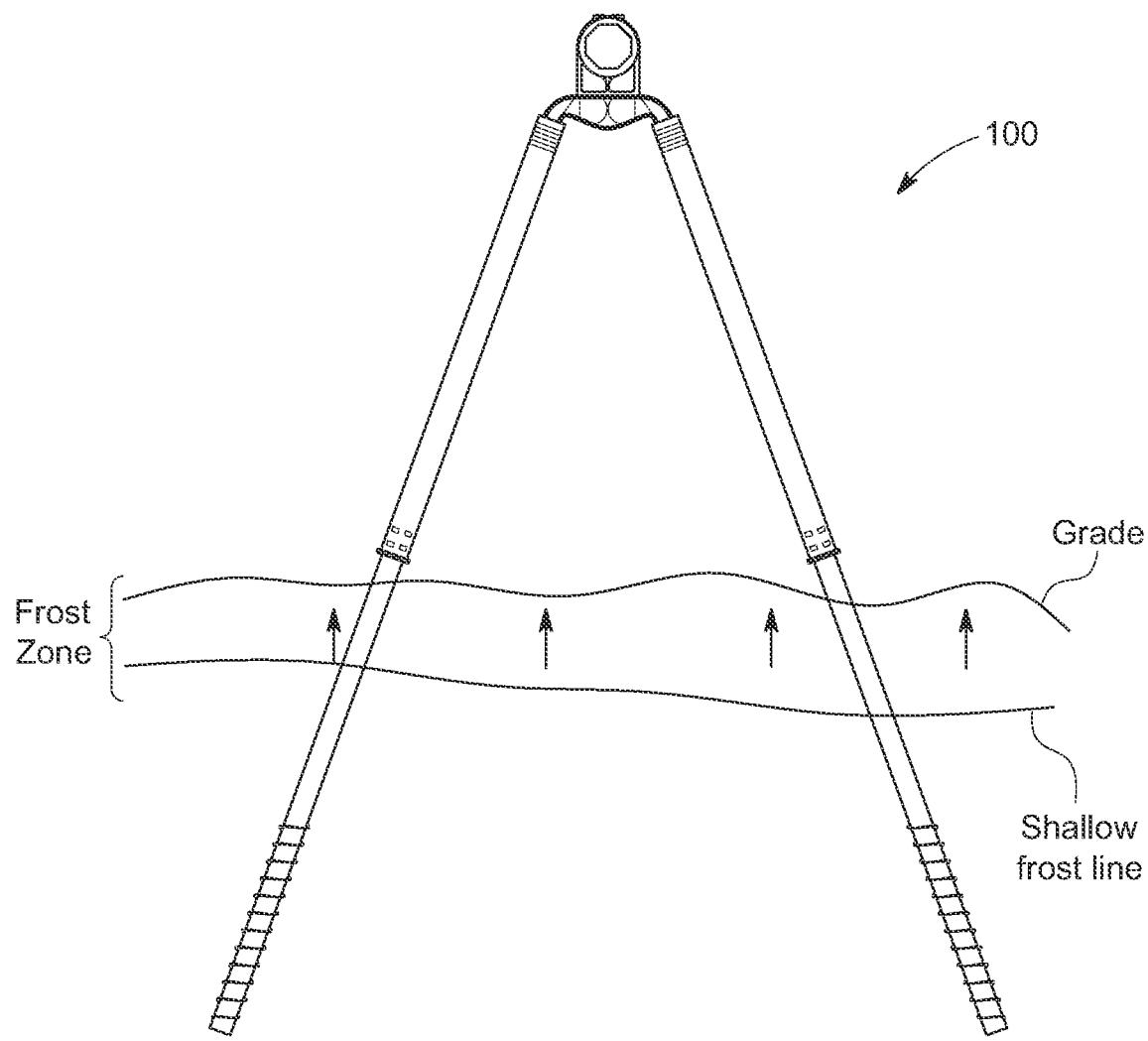
FIG. 3 shows a truss foundation according to various embodiments of the invention installed in a region with a shallow frost zone.

As discussed in the background, in colder, Northern environments, truss foundations with angled truss legs that extend below ground may be more prone to failure than plumb-driven monopiles. To that end, FIG. 3, shows a truss foundation for use in regions with a relatively shallow frost zone. The arrows in this figure between the frost line and grade illustrate the problem of frost heave. Frost heave occurs when subsurface moisture and/or water in the soil in the frost zone freezes, causing an uplifting effect on the surrounding soil. So-called ice lenses form in this zone and can attach to foundation components, causing movement and even failure of the systems they support. Extending foundations below the frost line does not necessarily ensure that the supported structure will be prevented from frost heaving. Movement in the soil resulting from ice lens growth can be transmitted to foundation components if the ice freezes to them, even when a portion of the component extends below the frost zone. This phenomena can be particular acute where the columns or foundation components are oriented at non-plumb angles. In such cases, upward frost heave applies a non-axial adfreeze moment to the components that must be resisted.

In the example of FIG. 3, truss foundation 100 is anchored well below the frost line with very little of the truss legs passing through the frost zone. Because the upward force of frost heave is proportional to the amount of surface area of the foundation in affected zone, the adfreeze moment here will be relatively small and can be resisted with deep embedment depths and, if necessary, larger diameter anchors.

Figure 4:
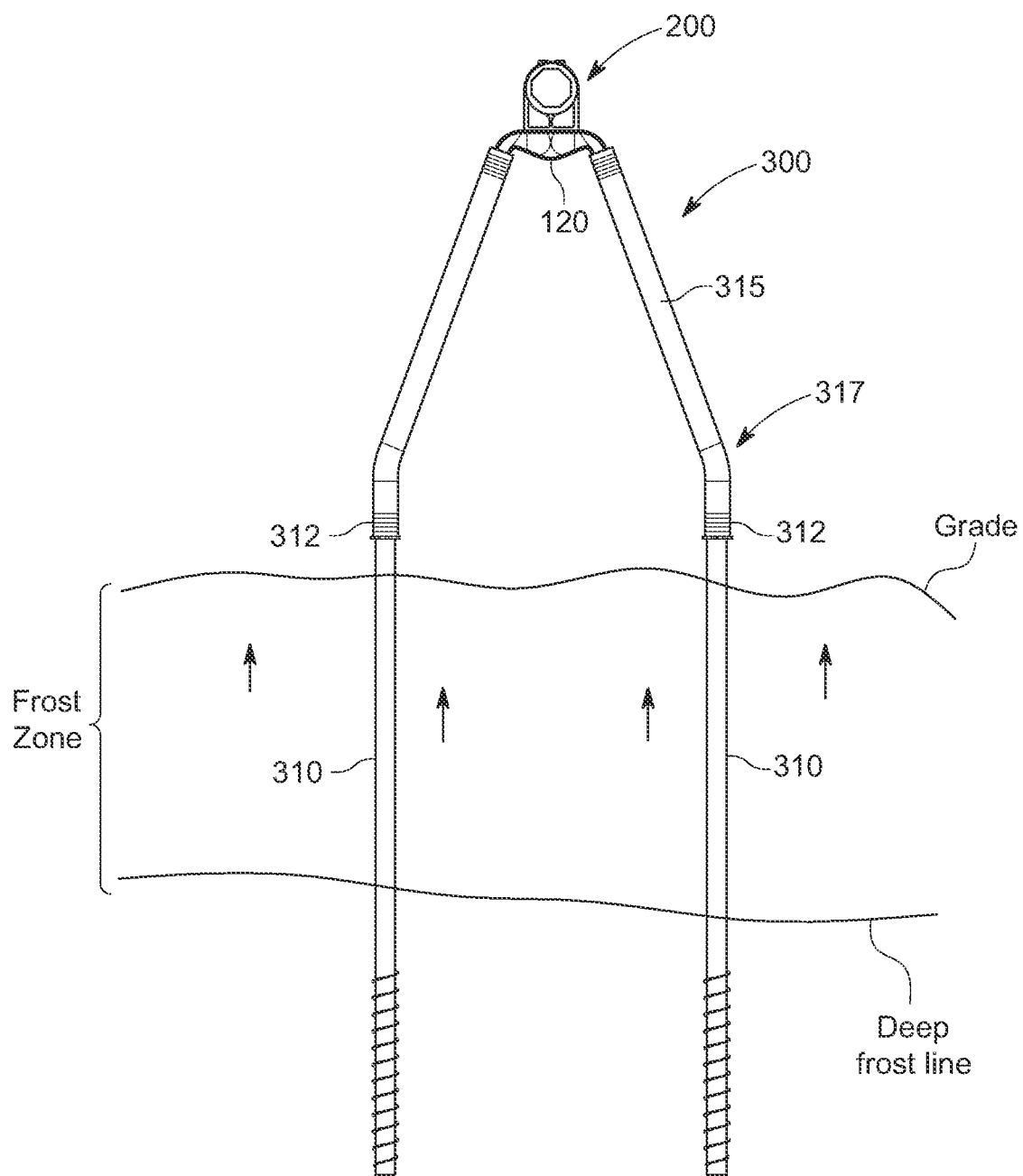
FIG. 4 shows a truss foundation according to various embodiments of the invention installed in a region with a deep frost zone.

By contrast, in the example of FIG. 4, the frost zone is much larger. In this case, most of screw anchor 310 is exposed in the frost zone. As a result, the adfreeze moment has the potential to be too large for the sub-frost zone portion of the foundation to resist. In order to compensate for this, truss legs 310 of foundation 300 have been driven into the ground so as to be substantially plumb, and therefore aligned with the direction of heave. This does not eliminate adfreeze but does eliminate the adfreeze moment and therefore will not expose the screw anchors to non-axial forces. In order to utilize standard truss components, such as truss cap 120, upper leg sections 315 of truss 300 have been modified to include elbow portion 317 proximate to their lower end where they change from being angled toward the truss cap to being plumb to match the geometry of driven screw anchors 310. In various embodiments, upper legs 315 are pre-bent to the appropriate angle to interface between connecting portions 122 of truss cap 120 and coupler 312 at the top of plumb screw anchors 310. When frost heave and adfreeze occur here, the forces felt on screw anchors 310 are substantially axial. Because individual structural members are relatively good at resisting axial forces, truss foundation 300 is much better able to remain intact in the face of frost heave and adfreeze than foundation 100 in FIG. 3.

Figure 5:
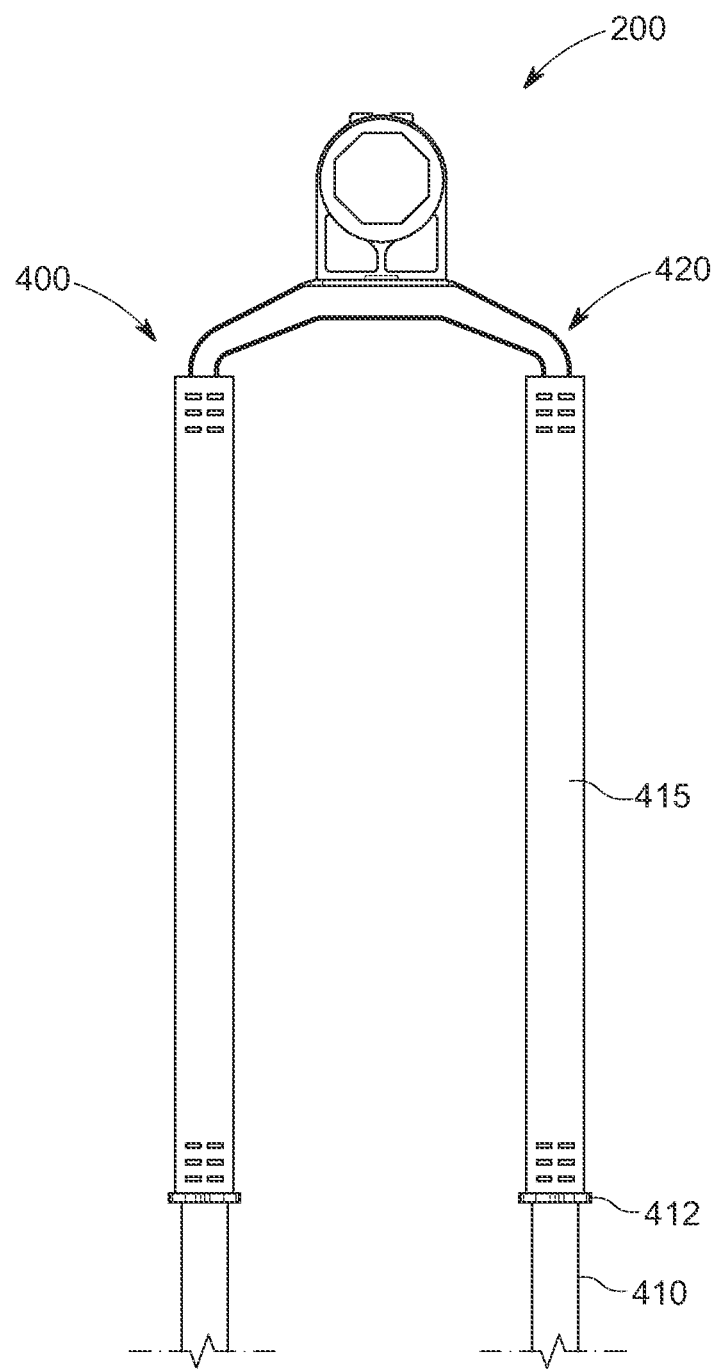
FIG. 5 is a front view of a truss foundation for frost heave environments according to various embodiments of the invention.
Figure 6A:
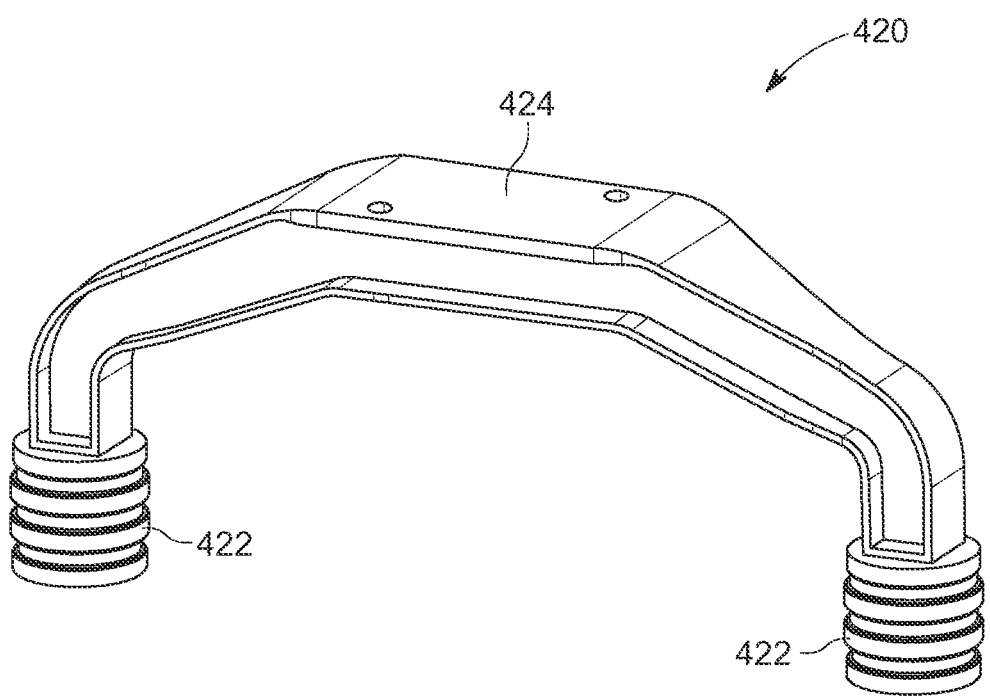
FIGS. 6A-C are perspective, side, and front views respectively of a truss cap for use with the truss foundation of FIG. 5 according to various embodiments of the invention.
Figure 6B:
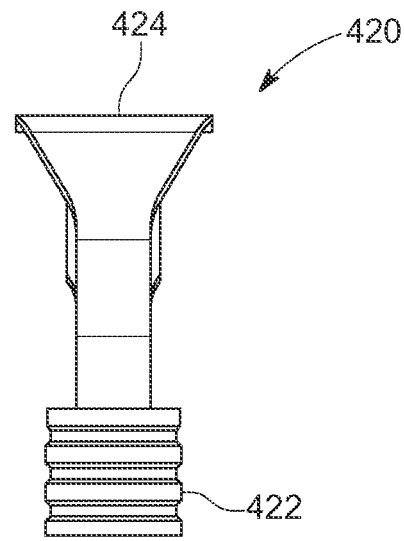
Figure 6C:
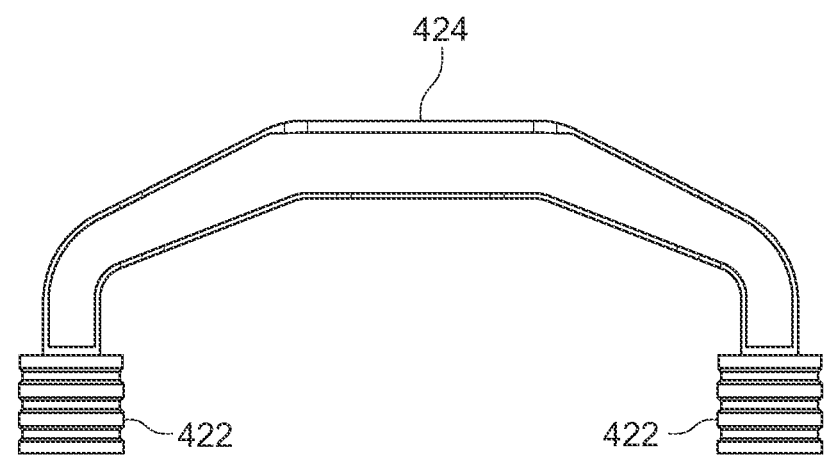

Turning now to FIGS. 5, this figure shows truss foundation 400 which is particularly well suited to frost heave applications in accordance with various embodiments of the invention. FIGS. 6A-6C show various views of truss cap 420 used in truss foundation 400. Once again, foundation 400 is built on a pair of adjacent, plumb-driven screw anchors 410. Though not shown, in various embodiments, screw anchors 410 are driven into the ground so that they extend well below the frost line. In this case, upper leg portions 415 are not pre-bent but instead substantially extend the axis of screw anchors 410. Truss cap 420 at the apex of truss 400 has a wider stance than truss cap 120 to accommodate the spacing between plumb oriented upper legs. In this example screw anchors 410 and upper leg portions 415 of each truss leg are substantially parallel to one another and separated by a distance of less than 1 meter (e.g., ~2-feet). Truss cap 420 has a handle shape with a pair of angled arms that terminate in downward projecting connecting portions 422 and meet centrally about elevated mounting platform 424. In various embodiments, a bearing assembly, tracker motor, or other tracker component is attached to mounting surface 424. Like truss cap 120, truss cap 420 may be made from a single casting.

Figure 7A:
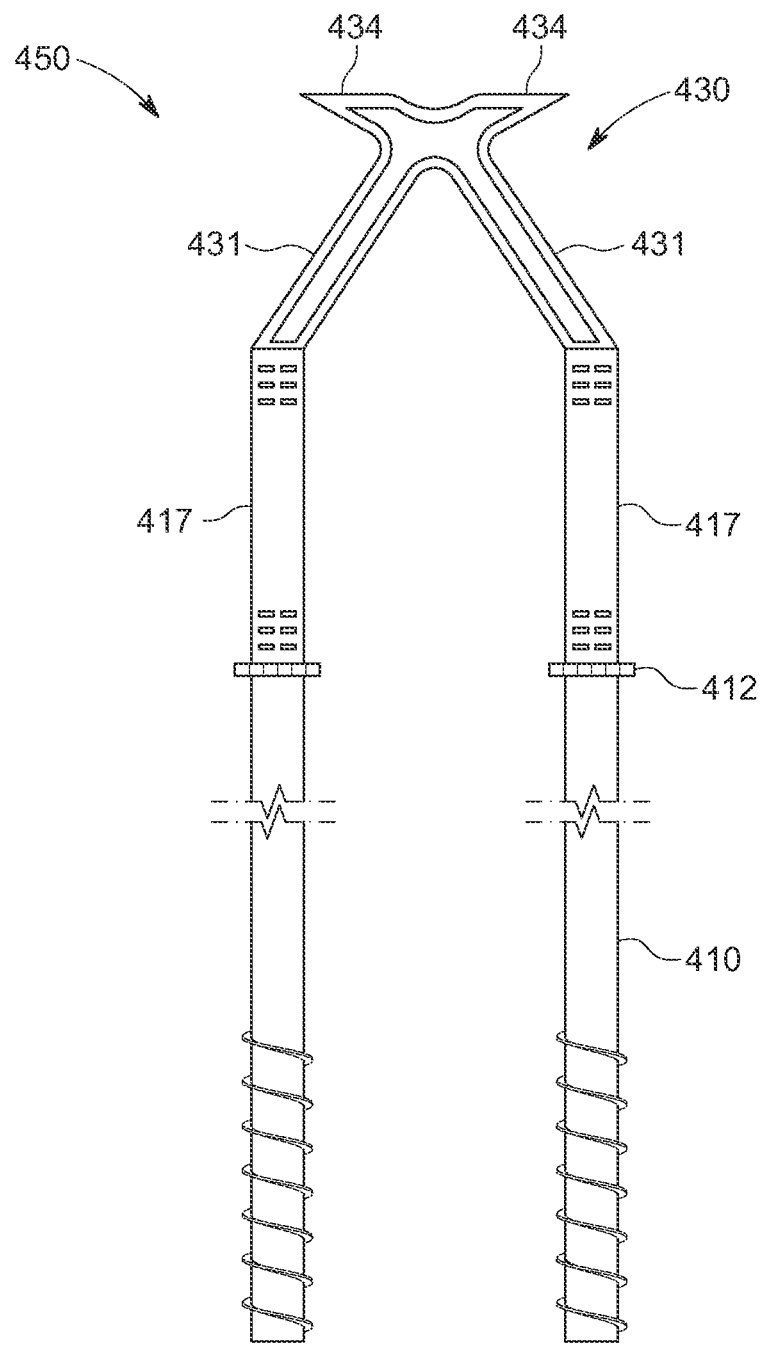
FIG. 7A shows another truss foundation for frost heave environments according to various embodiments of the invention.
Figure 7B:
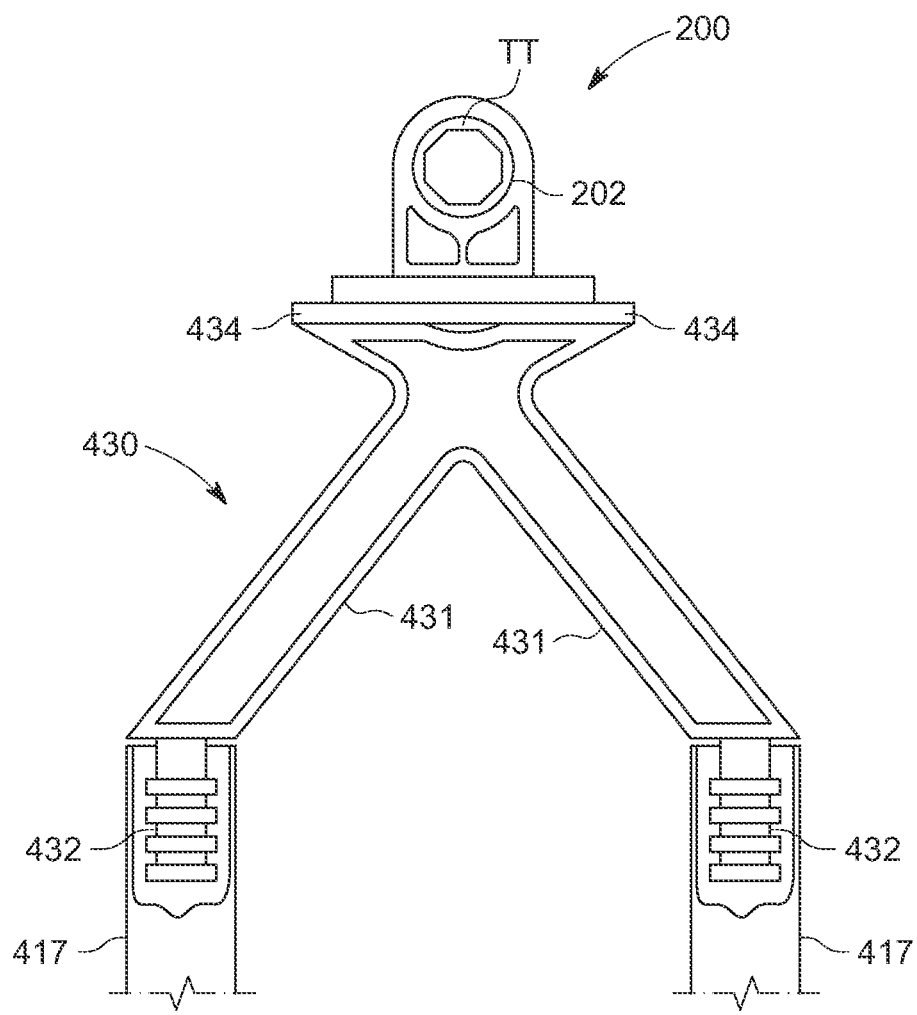
FIG. 7B shows a portion of the truss foundation of FIG. 7A supporting a tracker bearing assembly.
Figure 8:
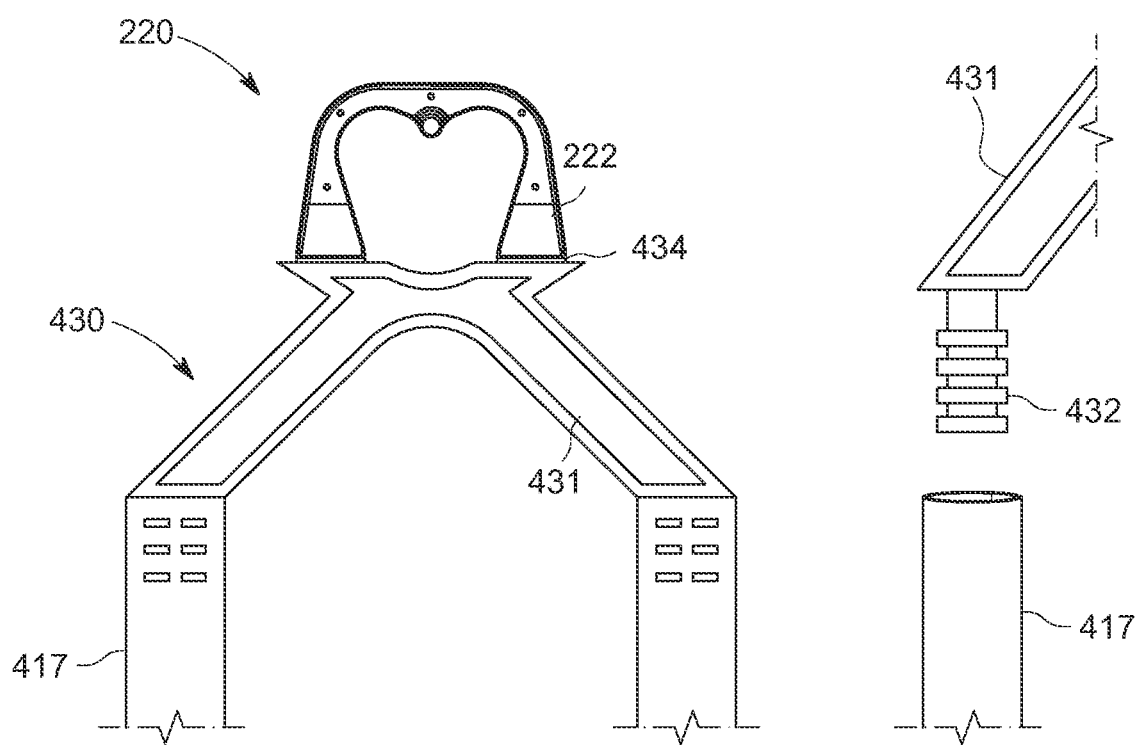
FIG. 8 shows a portion of the truss foundation of FIG. 7A supporting a bearing housing assembly.

FIGS. 7A, 7B, and 8 show another truss foundation for resisting frost heave forces according to various embodiments of the invention. FIG. 7A shows completed truss foundation 450, FIG. 7B shows foundation 450 with ATI bearing assembly 200 and FIG. 8 shows foundation 450 with NEXTracker BHA 220. Starting with 7A, foundation 450, like other foundations shown and discussed herein, consists of a pair of two-piece plumb-oriented truss legs joined together with truss cap 430. Truss cap 430 according to this embodiment, has a 4-pronged star shape with two lower arms 431 extending from the center at angles to one another and terminating in connecting portions 432. In various embodiments, these connecting portions 432 are received in upper leg sections 417 like the connecting portions of other truss caps discussed herein. Where they meet the truss legs, they have coupler portions extending vertically that are received within the upper ends of each leg. See, for example, FIGS. 7B and 8. In various embodiments, upper legs portions 417 are crimped where they overlap these connecting portions 432 as well as at the point of overlap with driving couplers 412.

As shown, truss cap 430 also has a pair of smaller upper arms that extend up and outward terminating in horizontal mounting platforms 434 to support a bearing assembly or bearing housing assembly (BHA) such as that shown in FIGS. 7B and 8, respectively. Starting with FIG. 7B, this figure shows bearing assembly 200 of a conventional tracker such as the ATI DuraTrack HZ tracker discussed herein attached to truss cap 430. In such a tracker, torque tube TT is contained within bearing assembly 200, in some cases surrounded by a bearing insert, and is able to rotate about its own axis to change the angle of the attached solar panels.

Assembly of truss 450 is accomplished in the same way as with other trusses discussed herein with a pair of adjacent screw anchors driven to be plumb on either side of an intended North-South oriented tracker row. In various embodiment, anchors are long enough so as to be driven to an embedment depth that enables the external thread for the anchor to penetrate below the frost line of the soil. Truss cap 430 is held in place using a jig or holder on the machine used to drive the screw anchors and upper legs 417 are sleeved over connecting portions 432 and then down onto coupler 412. All over lapping areas of upper leg 417 are then crimped to secure the truss's orientation.

FIG. 8 shows truss cap 430 supporting NEXTracker BHA 220. Legs 222 sit on support portions 434 Corp. of Fremont, CA. NEXTracker's single-axis tracker is a top down or so-called mechanically balanced tracker where the torque tube hangs from a pin through their bearing housing assembly and swings through an arc that is bounded by the bearing housing assembly. A torque tube bracket is attached to the pin and to the torque tube. The drive motor in this tracker is offset so that its axis of rotation is aligned with the bearing pin rather than with the torque tube. The tube curves up on either side of the motor to pass through the slewing drive's gear assembly. According to NEXTracker, this configuration is mechanically balanced so that there are no overturning moments regardless of the angle of the panels.

It should be appreciated that the foundation 450 shown in FIGS. 7A-B and 8 may also support a tracker motor such as a slewing tracker motor that drivers a circular gear box in both top-down (mechanically balanced trackers) and conventional bottom up-trackers. Foundation 450 may also be used to support a center structure that turns the torque tube and transfers power across multiple rows, such as that used in the ATI tracker. It should be appreciated that any of the foundations disclosed herein may be useful for supporting tracker drive motors, drive assemblies, outer tracker rows or any other rows that may be subjected to more moments relative to the foundations supporting the inner tracker rows and/or bearings. These foundations may be used to support other structures as well.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A truss foundation for a single-axis tracker comprising: a pair of truss legs extending into underlying ground; and a truss cap interconnecting the pair of truss legs, wherein the truss cap provides an elevated mounting surface for a tracker component and includes a pair of connecting portions angled apart from one another that extend below the elevated mounting surface that set a fixed leg separation angle and are received in respective ones of the truss legs, each truss leg comprising an upper leg portion sleeved over a coupler attached to an upper end of a driven screw anchor extending below a frost line of the underlying ground.

2. The truss foundation according to claim 1, wherein the tracker component is selected from the group consisting of a tracker bearing, a tracker drive motor, and a tracker center structure assembly.

3. The truss foundation according to claim 1, wherein each driven screw anchor is driven at a substantially plumb orientation.

4. The truss foundation according to claim 1, wherein connections between the upper leg portions and the screw anchors and between the upper leg portions and the truss cap are crimp connections made without fasteners.

5. The truss foundation according to claim 1, wherein each upper leg portion is oriented at an angle with respect to plumb.

6. A truss foundation for supporting a single-axis tracker above underlying ground comprising:
a pair of adjacent truss legs; and
a truss cap joining above-ground ends of the pair of adjacent truss legs, wherein the truss cap comprises a pair of connecting portions angled apart from one another that set a fixed leg separation angle and are received in respective ones of the truss legs, each truss leg comprising an upper leg portion sleeved over and connected to a coupler of a driven screw anchor.

7. The truss foundation according to claim 6, wherein each truss leg extends away from the truss cap at an angle with respect to plumb and terminates in an elbow that couples to a substantially plumb driven screw anchor.

8. The truss foundation according to claim 7, wherein each substantially plumb driven screw anchor extends below a frost line of the underlying ground.

9. The truss foundation according to claim 6, wherein the truss cap comprises a mounting portion for supporting a tracker component.

10. The truss foundation according to claim 9, wherein the bearing component is selected from the group consisting of a bearing assembly, a drive motor, and a center structure.

11. The truss foundation according to claim 6, wherein the truss cap comprises a single upper support portion for supporting a tracker component.

12. The truss foundation according to claim 6, wherein the truss cap comprises a pair of upper support portions for supporting a tracker component.

13. An assembly comprising:
a pair of truss legs extending into underlying ground; and
a truss cap interconnecting the pair of truss legs, wherein the truss cap provides at least one elevated mounting surface for a tracker component and includes a pair of connecting portions angled apart from one another that extend below the elevated mounting surface and that set a fixed leg separation angle and are received in respective ones of the truss legs, each truss leg comprising an upper leg portion sleeved over and connected to a coupler of a driven screw anchor.

14. The assembly according to claim 13, wherein each truss leg comprises an angled upper leg portion connected to a plumb driven screw anchor.

15. The assembly according to claim 14, wherein the connecting portions and upper leg portions are at an angle with respect to plumb.

16. The assembly according to claim 13, further comprising a tracker component attached to the at least one elevated mounting surface.

17. The assembly according to claim 16, wherein the tracker component comprises a component selected from the group consisting of a bearing assembly, a drive motor, and a center structure.

* * * * *